Oct. 2, 1962 W. H. BERRILL ETAL 3,056,165
MACHINES FOR VULCANIZING SOLES OF MICROCELLULAR
RUBBER ONTO SHOE BOTTOMS
Filed April 4, 1960
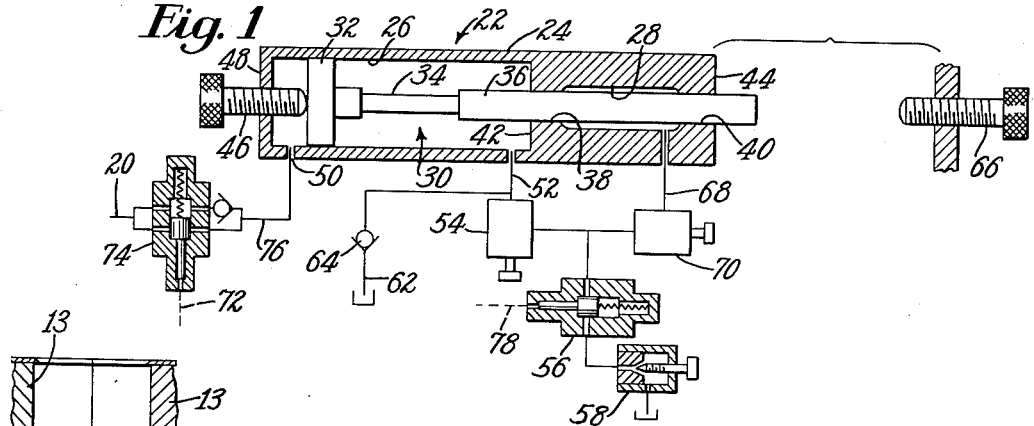
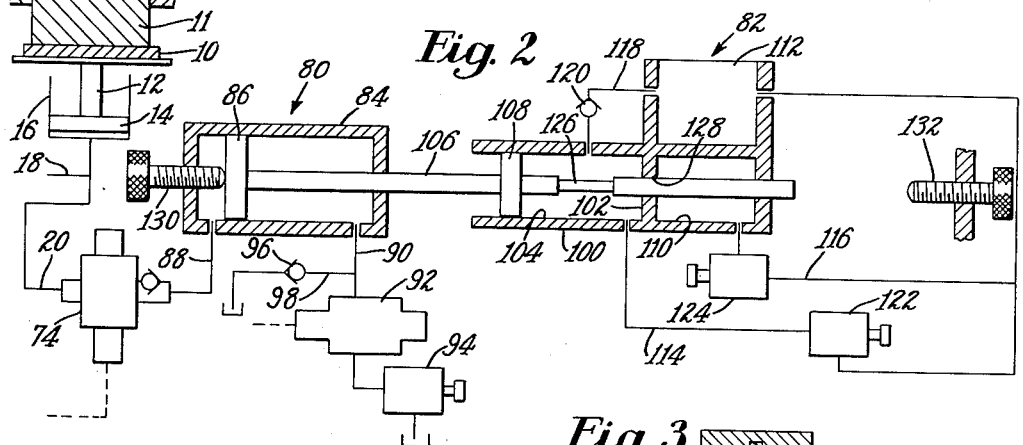
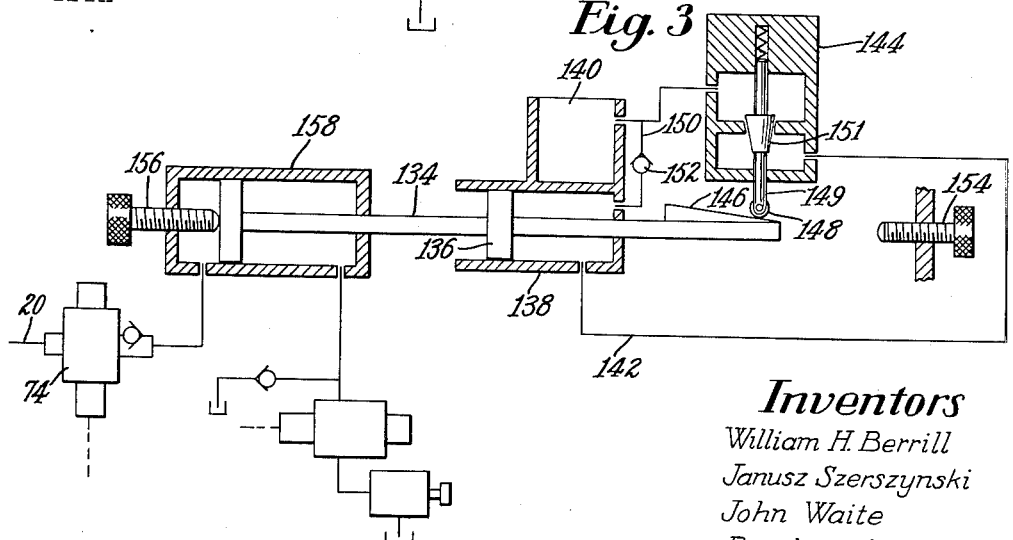
*Inventors*
William H. Berrill
Janusz Szerszynski
John Waite
By their Attorney

3,056,165
MACHINES FOR VULCANIZING SOLES OF MICROCELLULAR RUBBER ONTO SHOE BOTTOMS

William Herbert Berrill, Janusz Szerszynski, and John Waite, Leicester, England, assignors to United Shoe Machinery Corporation, Flemington, N.J., a corporation of New Jersey
Filed Apr. 4, 1960, Ser. No. 19,620
Claims priority, application Great Britain Apr. 16, 1959
1 Claim. (Cl. 18—17)

This invention relates to machines for molding and vulcanizing soles onto shoe bottoms, and more particularly, to machines of this type for molding and vulcanizing soles of microcellular rubber onto shoe bottoms.

Machines for molding and vulcanizing soles onto shoe bottoms are known to the art. A machine of this type is disclosed, for example, in United States Letters Patent No. 2,922,191, granted January 26, 1960, on an application filed in the name of George C. Barton. The machine illustrated in the Barton patent is provided with side mold members which close against the periphery of a lasted shoe and a bottom mold member movable heightwise of the shoe within the walls provided by the side mold members.

A machine of this type suitable for use in vulcanizing microcellular soles onto shoe bottoms is disclosed in United States Letters Patent No. 3,012,278, granted December 12, 1961, on an application filed in the name of Janusz Szerszynski. The machine disclosed in the application above-referred to is characterized by an initial operation of the bottom mold member to apply pressure to the charge in the mold cavity and to maintain such pressure during an initial period of the vulcanizing cycle. The initial period of vulcanization is followed by movement of the bottom mold member in a direction to enlarge the mold cavity thus to permit the expansion of a blowing agent in the rubber mixture thereby to produce the desired microcellular structure in the sole.

Previous attempts to vulcanize microcellular rubber soles directly to shoe bottoms have not been successful due largely to distortion of the sole which occurs when the pressure of the mold members of the machine is relieved and the shoe is removed from its support. Such distortion appears to be caused by continued activity of the blowing agent after the completion of the vulcanizing cycle causing internal pressure within the sole structure in directions widthwise and lengthwise as well as heightwise of the shoe.

It is an object of the present invention to provide in a machine for molding and vulcanizing microcellular soles onto shoe bottoms means for so controlling the expansion of the charge in the mold cavity that distortion of the sole after vulcanization is obviated.

In accordance with the present invention, provision is made for varying the rate of retracting movement of the bottom mold member during the vulcanization cycle in order to cause a variation in the rate of expansion of the charge in the mold cavity. It has been found that by varying the rate of expansion of the charge in the mold cavity in accordance with a pattern determined by trial and error the energy of the blowing agent is fully expended in the course of the vulcanizing cycle and distortion of the sole due to continued activity of the blowing agent after the mold is opened is obviated.

In accordance with a feature of the invention, the desired variation in the expansion of the charge in the mold cavity is achieved by providing a metering piston which is controlled by the flow of exhaust fluid incidental to the retraction of the piston which operates the bottom mold member. The movement of the metering piston is controlled during a first stage of expansion of the charge in the mold cavity by the flow of fluid from a first chamber in which the metering piston operates, means herein illustrated as an adjustable valve being provided for controlling the rate of flow of fluid from said chamber. During a second stage of expansion of the charge in the first mold cavity, the chamber in which the metering piston operates is connected to a second chamber from which fluid flows through a second control valve thus augmenting the flow of fluid from the chamber in which the metering piston operates. For connecting the first chamber to the second chamber, a rod carried by the metering piston and extending downstream therefrom through a bore in a partition between the two chambers is provided with a portion of reduced diameter which enters the bore in the partition to cause the flow of fluid from the first chamber to the second chamber thereby to initiate the second stage of the operation of the metering piston. Thus the rate of movement of the metering piston is increased and the expansion of the charge in the mold cavity is proportionally increased. It will be understood that the rate of movement of the metering piston during the two stages of expansion can be varied as required by adjustment of the control valves. The ratio of the first stage of expansion to the second stage of expansion has been found to be a critical factor in the provision of a vulcanizing cycle which will reliably insure that the energy of the blowing agent will be fully expended during the vulcanizing cycle while the sole is still contained within the mold members.

These and other features of the invention will now be described with reference to the accompanying drawings and pointed out in the appended claim.

In the drawings,

FIG. 1 is a diagrammatic view illustrating means for controlling the enlarging of the mold cavity of a machine of the type above referred to;

FIG. 2 is a diagrammatic view similar to FIG. 1 showing another form of means for controlling the enlarging of the mold cavity; and FIG. 3 is a diagrammatic view illustrating a third form of the control means.

The invention may be embodied in a machine of the type illustrated in the Barton patent above referred to or in any machine of this type having a bottom mold member which, in the operation of the machine, moves heightwise of a shoe in the machine between the side mold members.

In the operation of such a machine to vulcanize soles of microcellular rubber onto shoe bottoms a lasted shoe upper is mounted on a shoe form common to machines of this type and a charge of an unvulcanized rubber mixture having a suitable blowing agent incorporated therein is placed on the bottom mold member, said member forming the base of the mold cavity. In the operation of the machine the side mold members are advanced into contiguous relation to the bottom mold member to provide the side and end walls of the mold cavity, and plates carried by the side mold members engage the shoe to close the mold cavity. Vulcanizing heat is applied to the charge through the mold members and in the first stage of the vulcanizing cycle pressure is applied to the charge by upward movement of the bottom mold member. The application of heat and pressure to the charge renders it fluid and causes it to flow and fill the mold cavity. The heat applied to the charge initiates the action of the blowing agent. After an initial stage of the vulcanizing cycle during which the bottom mold member is advanced and held at the limit of its upward movement while the charge is partially vulcanized to build up a degree of strength therein, the bottom mold member is moved downwardly away from the shoe bottom to a measured degree and at a predetermined rate in order to allow the charge to expand under the action of the blowing agent in the direction of the thickness only of the sole member. After the termination of the downward movement of the bottom mold member, heat is maintained in the mold cavity for a sufficient time to complete the vulcanizing cycle.

In accordance with the present invention, the charge in the mold cavity is expanded in two stages—first, at a relatively slow rate to initiate the blowing action, and then at a higher rate as the blowing action proceeds to its completion, or alternatively, the rate of expansion may be progressively increased throughout the duration of the downward movement of the bottom mold member.

While the desired expansion of the sole in any particular case depends upon the thickness of the sole to be vulcanized onto the shoe bottom, some indication of the expansion required can be given with reference to the vulcanizing of a sole on a shoe in a run of infant sizes— say about size 2. A sole for such a shoe would be approximately 3/8" thick after the completion of the vulcanizing operation. For such a sole, an expansion of 1/8" to 3/16" has been found to be suitable. Assuming that the complete vulcanizing cycle takes 12 minutes, the initial high pressure stage of the cycle prior to the expansion of the blowing agent would require about 1½ minutes, and the period of expansion would vary from 5 to 10 minutes.

If the expansion of the sole takes place in two stages with a total expansion of 3/16" the initial stage of expansion takes about 5 minutes and during this period the bottom mold member moves downwardly at a rate of about 1/64" per minute. During the second stage of expansion the bottom mold member moves downwardly at a rate of about 5/64" per minute. The second period of expansion is substantially shorter than the first—on the order of 1½ minutes.

If a progressively varying rate of expansion is employed, expansion will start at the rate of approximately 1/64" per minute, and will increase gradually until it reaches about 5/64" per minute at the end of the period of expansion.

It will, of course, be understood that the figures above stated, while applicable to many rubber mixtures now in use, are not applicable to all such mixtures. For example, in certain mixtures satisfactory results have been achieved by maintaining a constant rate of expansion throughout the expansion period—the rate of expansion in such cases running as high as 5/64" per minute in the vulcanizing of soles that require a total expansion of 3/16".

Referring now to FIG. 2 illustrating diagrammatically parts of a machine embodying the features of the present invention, a table or carrier 10 is provided for supporting any one of a plurality of sizes and designs of bottom mold members one of which is shown in FIG. 2 and identified by the numeral 11. Cooperating with the bottom mold member is a pair of side mold members 13, the construction and operation of which are described in the Barton patent hereinbefore referred to. The carrier 10 is mounted on the upper end of a rod 12 terminating at its lower end in a piston 14 which is mounted for sliding movement heightwise of a shoe in the machine in a cylinder 16. This organization corresponds generally to the piston and cylinder assembly for operating the bottom mold member in the machine illustrated and described in the Barton patent above referred to. The piston 14 is moved upwardly to cause the bottom mold member to apply pressure to a charge in the mold cavity by fluid pressure transmitted from a suitable pump (not shown) through a pipe 18 and a pipe 20, the upper end of which communicates with the base of the cylinder 16. After the completion of the pressure period of the vulcanizing cycle the pipe 20 serves as an exhaust line through which fluid is exhausted from the cylinder 16 under the control of mechanism hereinafter described to permit the downward movement of the bottom mold member and the consequent expansion of the charge in the mold cavity.

When it is desired to expand the charge in the mold cavity in two stages—that is, an initial stage at a relatively low rate of expansion followed by a final stage at a higher rate, the organization illustrated in FIG. 1 may be provided. This organization is characterized by a metering device 22 comprising a cylinder 24 having a main chamber 26 and a secondary chamber 28. Slidably mounted in the cylinder 24 is a valve member 30 comprising a piston 32 having a rod characterized by a short section 34 of relatively small diameter and a long section 36 of relatively large diameter. As shown in FIG. 1, the long section 36 of the piston rod is slidably mounted in alined bores 38 and 40 formed respectively in a partition 42 and an end wall 44 of the cylinder. As shown in FIG. 1, the valve member is at the limit of its movement to the left, this being its rest position. This position of the valve member is determined by its engagement with an adjustable abutment screw 46 mounted in the left end wall 48 of the cylinder. It will be seen that with the valve member in this position, there is no communication between the main chamber 26 and the secondary chamber 28 since the long section 36 of the piston rod fits closely in the bore 38 and prevents the flow of fluid from one chamber to the other. Upon the opening of a valve 74, as hereinafter described, exhaust fluid flowing from the cylinder 16 enters the cylinder 24 through a port 50 located between the piston 32 and the end wall 48. The right end portion of the main chamber 26 is connected by a pipe 52 to a needle valve 54 which communicates with a control valve 56 and a needle valve 58 through which exhaust fluid from the chamber 26 flows to the sump. For supplying oil to the main chamber 26 during movement of the metering device to the left as seen in FIG. 1, a pipe 62 is arranged to conduct oil from the sump through a ball check valve 64 to the pipe 52.

The second stage of the expansion of the charge in the mold cavity is initiated by the movement of the metering device 22 to the right, as seen in FIG. 1, into a position in which the left end of the long section 36 of the piston rod has advanced into the secondary chamber 28 thus providing an opening between the bore 38 and the short section 36 of the piston rod through which oil is free to flow from the main chamber 26 to the secondary chamber 28. The movement of the metering device to the right as seen in FIG. 1 is limited by an abutment screw 66 which thus terminates the downward movement of the bottom mold member and determines the thickness of the sole. It will be seen that the movement of the metering device during the second stage of expansion is accelerated to the extent afforded by the flow of oil through a pipe 68 and a needle valve 70 connecting the secondary chamber 28 to the control valve 56.

In the operation of the machine the side molds 13 are closed and the bottom mold member 11 on the carrier 10 is moved upwardly by fluid pressure in the cylinder 16 to apply pressure to the charge in the mold cavity. Upon the completion of the pressure period of the vulcanizing cycle, pressure fluid in a pipe 72 communicating with the control valve 74 opens said valve to permit the flow of exhaust fluid from the pipe 20 through said valve 74 and through a pipe 76 to the port 50 in the cylinder 24. Concomitantly with the opening of the control valve 74, pressure fluid in a pipe 78 (FIG. 1) opens the control valve 56 to permit the flow of oil from the cylinder 24 through the needle valves 54 and 70, the control valve 56 and the needle valve 58 to the sump. It will be seen that the adjustment of the needle valve 54 determines the rate of flow of oil from the main chamber 26 and similarly the adjustment of the needle valve 70 determines the rate of flow of oil from the secondary chamber 28. The relation between the adjustment of the needle valve 54 and the adjustment of the needle valve 70 determines the time relation between the initial stage and the final stage of the movement of the metering device 22 and consequently the time relation between the initial stage and the final stage of the expansion of the charge in the mold cavity. It will also be seen that the space relation between the abutment screw 66 and the abutment screw 46 determines the extent of movement of the metering device and consequently the over-all thickness of the rubber sole.

In the organization illustrated in FIG. 1, the oil flowing into the cylinder 24 and from the cylinder through the needle valves 54 and 70 is supplied from the hydraulic circuit of the machine. In the course of the operation of the machine there is a considerable rise in the temperature of the oil with increase in viscosity necessitating readjustments of the needle valves 54 and 70 in order to maintain uniformity in the operation of the illustrated machine.

In the metering organizations illustrated in FIGS. 2 and 3, oil is drawn into the metering cylinder from an auxiliary supply which is not affected by the rise in temperature of the hydraulic oil thus permitting the operation of the machine without readjustments of the needle valves.

The organization illustrated in FIG. 2 comprises a metering means 80 and a dash pot mechanism 82. The metering means comprises a closed cylinder 84 in which there is slidably mounted a piston 86. The piston is operated by pressure fluid supplied by a pipe 88 corresponding to the pipe 76 illustrated in FIG. 1. The exhaust end of the cylinder 84 is connected to the sump by a pipe 90, a control valve 92, and a needle valve 94. During movement of the piston to the left as seen in FIG. 2, oil is drawn into the cylinder 84 from the sump through a ball check valve 96 and a pipe 98. The control valve 92 is operated as hereinbefore described with reference to the organization illustrated in FIG. 1. The dash pot mechanism comprises a cylinder 100 having two chambers divided by a partition 102. The cylinder 100 is arranged in axial alinement with the cylinder 84 and has mounted in its left chamber 104 the right end portion of a piston rod 106 connected to the piston 86 in the cylinder 84. Mounted on the right end portion of the rod 106 is a piston 108 which is slidably mounted in the left chamber 104 of the dash pot cylinder. The chamber 104 and a closed chamber 110 in the right end portion of the dash pot cylinder are respectively connected to an open reservoir 112 by pipes 114 and 116, respectively. The illustrated reservoir is in the form of a superstructure extending upwardly from the closed chamber 110. Oil flows freely from the reservoir 112 through a pipe 118 and a ball check valve 120 to the chamber 104. In order to provide for the regulation of the flow of oil from the chambers 104 and 110 respectively, a needle valve 122 is provided in the pipe line 114 and a needle valve 124 is provided in the pipe line 116.

The metering organization illustrated in FIG. 2 functions as a two-rate control means which regulates the expansion of the charge in the mold cavity in substantially the same manner as the organization illustrated in FIG. 1 except that frequent adjustment of the valves 122 and 124 is not required to compensate for increased viscosity of the oil since the fluid circuit through the chambers 104 and 110 is separate from the hydraulic circuit of the machine and consequently is not affected by the increase in temperature which occurs in the main body of hydraulic oil. Since no high pressure is developed in the circuit through the chambers 104 and 110, the temperature and the viscosity of the oil flowing through said chambers remains substantially constant.

It will be understood that in the organization illustrated in FIG. 2 the initial rate of expansion of the charge in the mold cavity is controlled by the setting of the needle valve 122 which controls the rate of flow of oil from the chamber 104 to the reservoir 112. When the reduced portion 126 of the piston rod enters the bore 128 in the partition 102, oil flows from the chamber 104 into the chamber 110 and through the pipe 116, and the valve 124 to the reservoir thus increasing the rate of movement of the piston 86 and correspondingly increasing the expansion of the charge in the mold cavity. In the organization illustrated in FIG. 2 the relative length of the two expansion periods is determined by the adjustment of an abutment screw 130 mounted in the left end wall of the cylinder 84 and the final thickness of the sole is determined by the adjustment of an abutment screw 132 arranged to be engaged by the right end of the piston rod 106.

In certain types of work it has been found desirable to provide a continuous rate of expansion of the charge in the mold cavity starting at a minimum rate and increasing continuously to a maximum rate. For this type of work the metering organization illustrated in FIG. 3 is provided. This organization corresponds in most respects to the organization illustrated in FIG. 2 but differs therefrom in that a piston rod 134 of constant diameter is provided with a piston 136 operating in an open cylinder 138 which is connected to a reservoir 140 by a pipe line 142 in which is inserted a needle valve 144. The setting of the valve 144 is controlled by a cam 146 carried by the right end portion of the piston rod 134 and arranged to act on a cam follower or roll 148 carried by a stem 149 extending downwardly from a frustoconical valve body 151. During the retraction of the piston, oil flows from the reservoir 140 into the cylinder 138 through a pipe line 150 and a ball check valve 152. The total expansion of the charge in the mold cavity is determined by the setting of an abutment screw 154 which is engaged by the right end of the piston rod 134 to terminate its advancement. An abutment screw 156 in the left end wall of a metering cylinder 158 determines the rest position of the piston.

Having thus described our invention what we claim as new and desire to secure by Letters Patent of the United States is:

A machine for molding and vulcanizing outsoles onto shoe bottoms comprising side mold members, a bottom mold member movable heightwise of a shoe in the machine between the side mold members, a pressure fluid operated piston for advancing the bottom mold member in a direction to contract the mold cavity, a metering piston for controlling movement of the pressure fluid operated piston in a direction to expand the mold cavity, means for causing the movement of the metering piston to occur in two stages: a first stage during which a relatively slow motion of the metering piston causes a correspondingly slow motion of the bottom mold member, and a second stage during which an accelerated motion of the metering piston causes a correspondingly accelerated motion of the bottom mold member, said means comprising a first chamber in which the metering piston operates, a rod extending downstream from the metering piston, a second chamber having end walls in which the rod is slidably mounted, one of said end walls forming a partition between the chambers, said rod having a portion of reduced diameter whereby movement of the metering piston opens a channel between the two chambers at the beginning of the second stage of the movement of the metering piston, a first valve through which fluid flows from the first chamber, and a second valve through which fluid flows from the second chamber thereby to augment the total flow of fluid from the first chamber.

References Cited in the file of this patent

UNITED STATES PATENTS

| | | |
|---|---|---|
| 627,840 | Butterfield | June 27, 1899 |
| 1,931,902 | Ayster | Oct. 24, 1933 |
| 1,957,697 | Conway | May 8, 1934 |
| 2,222,819 | Light | Nov. 26, 1940 |
| 2,229,965 | Ernst et al. | Jan. 28, 1941 |
| 2,588,520 | Halgren et al. | Mar. 11, 1952 |
| 2,674,138 | Mize | Apr. 6, 1954 |
| 2,736,294 | Buehner | Feb. 28, 1956 |
| 2,769,205 | Pfleumer | Nov. 6, 1956 |
| 2,866,227 | Davidson | Dec. 30, 1958 |